US012019902B2

(12) United States Patent
Haile (10) Patent No.: US 12,019,902 B2
(45) Date of Patent: *Jun. 25, 2024

(54) DATA LINEAGE IN A DATA PIPELINE

(71) Applicant: Data Culpa, Inc., Carlisle, MA (US)

(72) Inventor: J. Mitchell Haile, Carlisle, MA (US)

(73) Assignee: Data Culpa, Inc., Carlisle, MA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/874,913

(22) Filed: Jul. 27, 2022

(65) Prior Publication Data

US 2023/0041906 A1 Feb. 9, 2023

Related U.S. Application Data

(60) Provisional application No. 63/228,718, filed on Aug. 3, 2021.

(51) Int. Cl.
| | | |
|---|---|---|
| *G06F 11/34* | (2006.01) | |
| *G06F 3/06* | (2006.01) | |
| *G06F 16/215* | (2019.01) | |
| *G06F 17/17* | (2006.01) | |

(52) U.S. Cl.
CPC .......... *G06F 3/0653* (2013.01); *G06F 3/0604* (2013.01); *G06F 3/067* (2013.01); *G06F 16/215* (2019.01)

(58) Field of Classification Search
None
See application file for complete search history.

(56) References Cited

U.S. PATENT DOCUMENTS

| | | | | |
|---|---|---|---|---|
| 11,263,095 | B1* | 3/2022 | Jibaja | G06F 11/2023 |
| 11,429,614 | B2* | 8/2022 | Haile | C10B 49/22 |
| 2011/0235809 | A1* | 9/2011 | Schuijers | H04S 1/00 |
| | | | | 381/17 |
| 2012/0027320 | A1* | 2/2012 | Nakazono | H04N 25/61 |
| | | | | 382/275 |
| 2018/0143826 | A1* | 5/2018 | Crabtree | G06F 8/77 |
| 2020/0174966 | A1* | 6/2020 | Szczepanik | G06F 16/13 |
| 2020/0401397 | A1* | 12/2020 | Thomas | G06F 11/327 |
| 2021/0141635 | A1* | 5/2021 | Thomas | G06F 11/0775 |
| 2021/0248144 | A1* | 8/2021 | Haile | G06N 5/04 |
| 2021/0381443 | A1* | 12/2021 | Otsuka | F02C 9/52 |
| 2022/0014555 | A1* | 1/2022 | Crabtree | G06Q 10/103 |
| 2022/0197763 | A1* | 6/2022 | Jibaja | G06F 11/2023 |

(Continued)

*Primary Examiner* — Hyun Nam (57) ABSTRACT

Various embodiments comprise systems and methods to monitor operations of a data pipeline. In some examples, a data pipeline receives data inputs, processes the data inputs, and responsively generates and transfers data outputs. Data monitoring circuitry monitors the operations of the data pipeline circuitry, identifies an input change between an initial one of the data inputs and a subsequent one of the data inputs, and identifies an output change between an initial one of the data outputs and a subsequent one of the data outputs. The data monitoring circuitry correlates the input change to the output change, determines a quality threshold for the output change based on the correlation, and determines when the output change falls below the quality threshold. When the output change falls below the quality threshold, the data monitoring circuitry generates and transfers an alert that indicates the input change and the output change.

20 Claims, 7 Drawing Sheets

(56) References Cited

U.S. PATENT DOCUMENTS

| | | | | |
|---|---|---|---|---|
| 2022/0261403 A1* | 8/2022 | Haile | .................. | H04L 67/1095 |
| 2022/0343109 A1* | 10/2022 | Haile | ....................... | G06N 7/01 |
| 2023/0040648 A1* | 2/2023 | Haile | ................ | G06F 16/24568 |
| 2023/0040834 A1* | 2/2023 | Haile | .................. | G06F 16/2365 |
| 2023/0041906 A1* | 2/2023 | Haile | .................. | G06F 11/3006 |
| 2023/0044986 A1* | 2/2023 | Haile | .................. | G06F 11/3409 |
| 2023/0058885 A1* | 2/2023 | Haile | .................. | G06F 11/0709 |
| 2023/0177027 A1* | 6/2023 | Bansal | .................. | G06F 16/215 |
| | | | | 707/690 |
| 2023/0259441 A1* | 8/2023 | Haile | .................. | G06F 11/3457 |
| | | | | 714/741 |

* cited by examiner

DATA LINEAGE IN A DATA PIPELINE

RELATED APPLICATIONS

This U.S. Patent Application claims priority to U.S. Provisional Patent Application 63/228,718 entitled "DATA LINEAGE IN A DATA PIPELINE" which was filed on Aug. 3, 2021, and which is incorporated by reference into this U.S. Patent Application in its entirety.

BACKGROUND

A data pipeline comprises a series of data processing elements that intake data from a data source, process the input data for a desired effect, and transfer the processed data to a data target. Data pipelines are configured to intake data that comprises a known format for their data processing elements to operate accurately. When the input data to a data pipeline is altered, the data processing elements may not recognize the changes which can cause malfunctions in the operation of the data pipeline. Changes to input data often arise when the data sets are large which results in variety of technical issues exist when processing or ingesting data received through a data pipeline. Implicit schema and schema creep like typos or changes to schema often cause issues when ingesting data. Completeness issues can also arise when ingesting data. For example, completeness can be compromised when there is an incorrect count of data rows/documents, there are missing fields or missing values, and/or there are duplicate and near-duplicate data entries. Additionally, accuracy issues may arise when there are incorrect types in fields. For example, a string field that often comprises numbers is altered to now comprise words. Accuracy issues may further arise when there are incorrect category field values and incorrect continuous field values. For example, a continuous field may usually have distribution between 0 and 100, but the distribution is significantly different on updated rows or out of our usual bounds. Data pipelines may have bugs which impact data quality and data pipeline code is difficult to debug.

Data pipeline monitoring systems are employed to counteract the range of technical issues that occur with data pipelines. Traditional data pipeline monitoring systems employ a user defined ruleset that governs what inputs and outputs for a data pipeline should look like. Manually defining a data ruleset is difficult and may require an extended period of time to create. The amount of high-quality data sets which are needed to manually generate data rulesets are often limited which further compounds this problem. The inputs and outputs of data pipelines may change over time, and as such, the manually defined rulesets can become outdated and must be updated. Data pipelines often operate as black boxes causing their data processing operations to remain hidden from pipeline monitoring systems. Unfortunately, the data pipeline monitoring systems do not efficiently track the changes to the inputs and outputs of data pipelines to maintain data lineage. Moreover, the data pipeline monitoring systems do not effectively differentiate minor changes to inputs and outputs from those that adversely affect the operations of the data pipeline.

OVERVIEW

This Overview is provided to introduce a selection of concepts in a simplified form that are further described below in the Detail Description. This summary is not intended to identify key features or essential features of the claimed subject matter, nor is it intended to be used as an aid in determining the scope of the claimed subject matter.

Various embodiments of the present technology generally relate to solutions for maintaining data integrity. Some embodiments comprise a data pipeline monitoring system configured to monitor the operations of a data pipeline. In the data pipeline monitoring system, the data pipeline receives data inputs, processes the data inputs, and responsively generates and transfers data outputs. Data monitoring circuitry monitors the operations of the data pipeline circuitry, identifies an input change between an initial one of the data inputs and a subsequent one of the data inputs, and identifies an output change between an initial one of the data outputs and a subsequent one of the data outputs. The data monitoring circuitry correlates the input change to the output change, determines a quality threshold for the output change based on the correlation, and determines when the output change falls below the quality threshold. When the output change falls below the quality threshold, the data monitoring circuitry generates and transfers an alert that indicates the input change and the output change.

Some embodiments comprise a method of operating a data pipeline monitoring system to monitor the operations of a data pipeline. The method includes a data pipeline receiving data inputs, processing the data inputs, responsively generating data outputs, and transferring the data outputs. The method continues with data monitoring circuitry monitoring the operations of the data pipeline circuitry, identifying an input change between an initial one of the data inputs and a subsequent one of the data inputs, and identifying an output change between an initial one of the data outputs and a subsequent one of the data outputs. The method continues with the data monitoring circuitry correlating the input change to the output change, determining a quality threshold for the output change based on the correlation, and determining when the output change falls below the quality threshold. The method continues with the data monitoring circuitry generating and transferring an alert that indicates the input change and the output change when the output change falls below the quality threshold.

Some embodiments comprise a non-transitory computer-readable medium storing instructions to monitor operations of a data pipeline. The instructions, in response to execution by one or more processors, cause the one or more processors to drive a system to perform pipeline monitoring operations. The operations comprise monitoring the operations of the data pipeline wherein the data pipeline receives data inputs, processes the data inputs, and responsively generates and transfers data outputs. The operations further comprise identifying an input change between an initial one of the data inputs and a subsequent one of the data inputs. The operations further comprise identifying an output change between an initial one of the data outputs and a subsequent one of the data outputs. The operations further comprise correlating the input change to the output change. The operations further comprise determining a quality threshold for the output change based on the correlation. The operations further comprise determining when the output change falls below the quality threshold. The operations further comprise generating an alert that indicates the input change and the output change when the output change falls below the quality threshold. The operations further comprise transferring the alert.

DESCRIPTION OF THE DRAWINGS

Many aspects of the disclosure can be better understood with reference to the following drawings. The components in the drawings are not necessarily drawn to sale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to solutions for monitoring the operations of data pipeline systems. More specifically, embodiments of the present technology relate to systems and methods for correlating changes between inputs and outputs of a data pipeline to identify data lineage. Now referring to the Figures.

Figure 1:
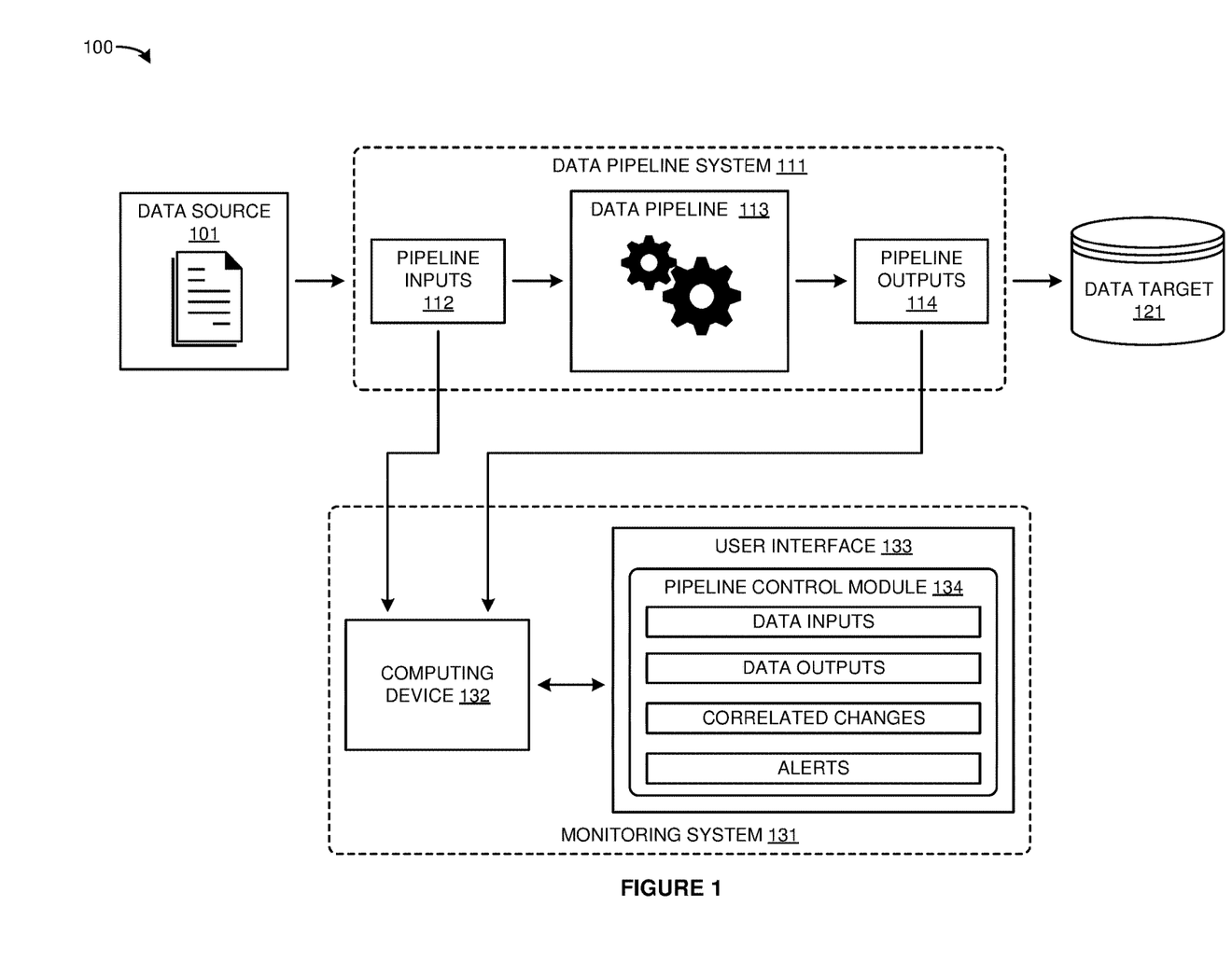
FIG. 1 illustrates an exemplary data processing environment to monitor operations of a data pipeline.

FIG. 1 illustrates data processing environment 100 to monitor operations of a data pipeline. Data processing environment 100 processes raw data generated by data sources into a processed form for use in data analytics, data storage, data harvesting, and the like. Data processing environment 100 comprises data source 101, data pipeline system 111, data target 121, and monitoring system 131. Data pipeline system 111 comprises pipeline inputs 112, data pipeline 113, and pipeline outputs 114. Data monitoring system 131 comprises computing device 132, user interface 133, and pipeline control module 134. In other examples, data processing environment 100 may include fewer or additional components than those illustrated in FIG. 1. Likewise, the illustrated components of data processing environment 100 may include fewer or additional components, assets, or connections than shown. Each of data source 101, data pipeline system 111, data target 121, and/or monitoring system 131 may be representative of a single computing apparatus or multiple computing apparatuses.

Data source 101 is operatively coupled to data pipeline system 111 and is representative one or more systems, apparatuses, devices, and the like that generate raw data for consumption by data pipeline system 111. Data source 101 may comprise a computing device of an industrial system, a financial system, research system, or some other type of system configured to generate data that characterizes that system. For example, data source 101 may comprise a computer affiliated with an online transaction service that generates sales data which characterizes events performed by the online transaction service. It should be appreciated that the type of data generated by data source 101 is not limited.

Data pipeline system 111 is operatively coupled to data source 101, data target 121, and monitoring system 131. Data pipeline system 111 is representative of a data processing environment which intakes "raw" or otherwise unprocessed data from data source 101 and emits processed data configured for consumption by an end user. For example, data pipeline system 111 may comprise a data pipeline, an Extract Transform Load (ETL) system, a data processing job, a data transform function, a data lake or data repository system, or some other type of type processing computing device. Data pipeline system 111 comprises pipeline inputs 112, data pipeline 113, and pipeline outputs 114. Pipeline inputs 112 comprise unprocessed data generated by data source 101. Pipeline outputs 114 comprise processed data generated by the operation of data pipeline 113. Data pipeline 113 comprises one or more computing devices that are connected in series that intake pipeline inputs 112 received from data source 101 and generate pipeline outputs 114. For example, the computing devices of data pipeline 113 may ingest pipeline inputs 112 and execute transform functions on pipeline inputs 112. The execution of the transform functions alters pipeline inputs 112 into a consumable form to generate pipeline outputs 114. For example, pipeline inputs 112 may comprise a non-standard schema. The execution of the transform functions may standardize the schema of pipeline inputs 112 to generate pipeline outputs 114 which can then be loaded into a database on data target 121.

Data target 121 is operatively coupled to data pipeline system 111. Data target 121 is representative of one or more computing systems comprising memory that receive pipeline outputs 114 generated by data pipeline 113. Data target 121 may comprise a database, data structure, data repository, data lake, another data pipeline, and/or some other type of data storage system.

Monitoring system 131 is operatively coupled to data pipeline system 111. Monitoring system 131 is representative of one or more computing systems configured to monitor the operation of data pipeline system 111. Monitoring system 131 is configured to ingest pipeline inputs and pipeline outputs from data pipeline system 111. Monitoring system 131 comprises computing device 132, user interface 133, and pipeline control module 134. Computing device 132 comprises one or more computing apparatuses configured to host an application(s) configured to monitor the operation of data pipeline system 111 (e.g., pipeline control module 134). It should be appreciated that the specific number of applications/modules hosted by computing device 132 is not limited. Exemplary applications hosted by computing device 132 to monitor the operations of data pipeline system 111 include Data Culpa Validator and the like. Computing device 132 is coupled to user interface 133. User interface 133 comprises a display, keyboard, touchscreen, tablet, and/or other elements configured to provide a visual representation of, and means to interact with, pipeline control module 134. User interface 133 displays pipeline control module 134 that allows a user to interact with the application(s) hosted by computing device 102, including the application configured to monitor the operation of data pipeline system 111.

Pipeline control module 134 comprises visual elements for data inputs, data outputs, correlated changes, and alerts. The visual elements of pipeline control module 134 illustrate the data lineage of inputs/outputs associated with data pipeline system 111. The visual element for data inputs comprises information like volume, type, schema, values, and the like characterizing the pipeline inputs 112. The visual element for data outputs comprises information like volume, type, schema, values, and the like characterizing the pipeline inputs 114. The visual element for correlated changes comprises information that characterizes changes in pipeline inputs 112 and corresponding changes in pipeline outputs 114 to maintain data lineage in data pipeline system 111. The visual element for alerts comprises information that characterizes ones of the correlated changes that adversely affect pipeline outputs 114. For example, changes in pipeline inputs 112 that cause pipeline outputs 114 to become malformed may be indicated in the visual elements for alerts.

Data source 101, Data pipeline system 111, data target 121, and monitoring system 131 comprise microprocessors, software, memories, transceivers, bus circuitry, and the like. The microprocessors comprise Central Processing Units (CPU), Graphical Processing Units (GPU), Application-Specific Integrated Circuits (ASIC), Field Programmable Gate Array (FPGA), and/or types of processing circuitry. The memories comprise Random Access Memory (RAM), flash circuitry, disk drives, and/or the like. The memories store software like operating systems, user applications, data analysis applications, and data processing functions. The microprocessors retrieve the software from the memories and execute the software to drive the operation of data processing environment 100 as described herein. The communication links that support connect the elements of data processing system use metallic links, glass fibers, radio channels, or some other communication media. The communication links use ENET, Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), virtual switching, inter-processor communication, bus interfaces, and/or some other data communication protocols. Data pipeline system 111 and monitoring system 131 may exist as unified computing devices or may be distributed between multiple computing devices.

Figure 2:
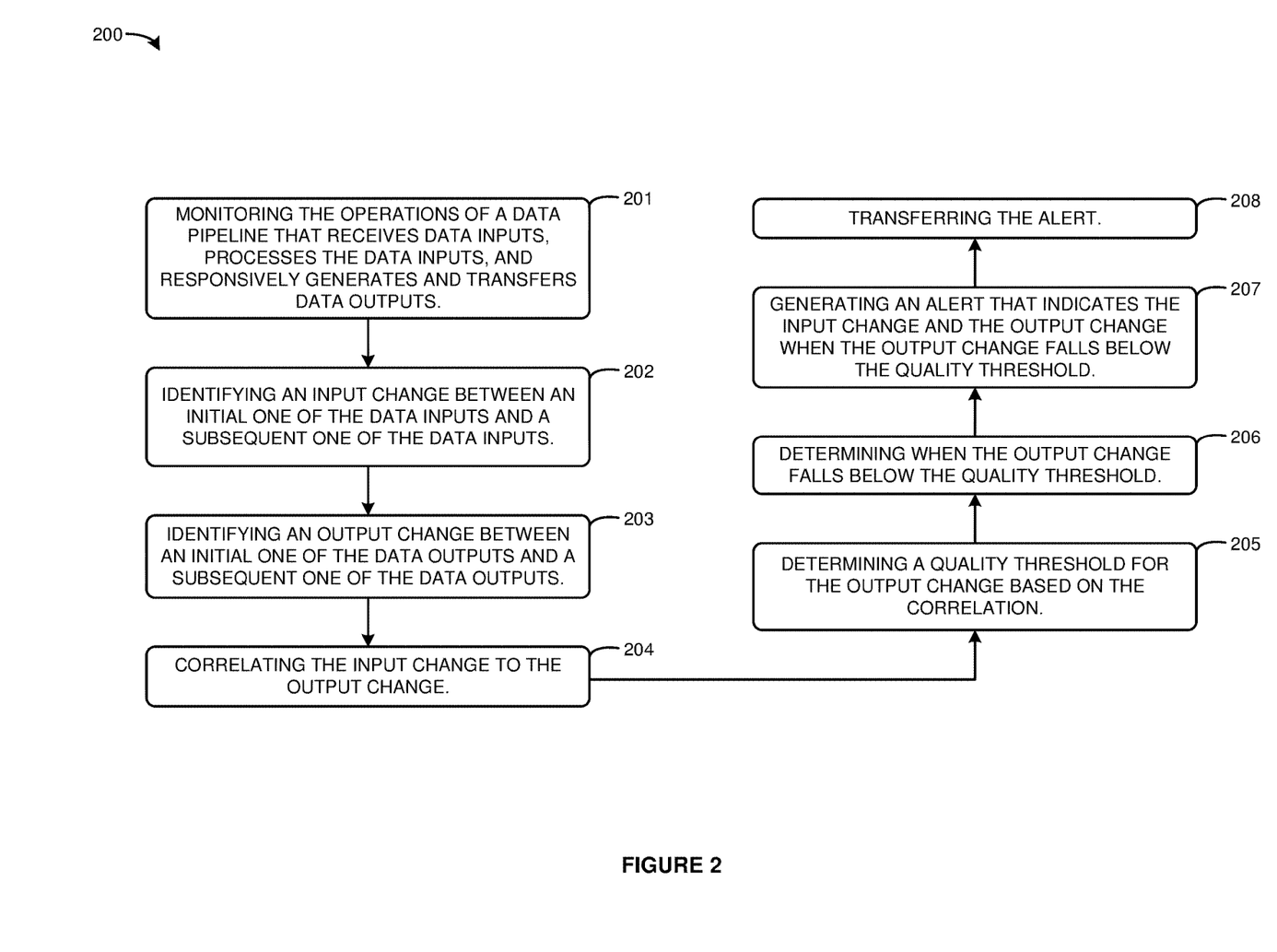
FIG. 2 illustrates an exemplary operation to monitor operations of a data pipeline.

In some examples, data processing environment 100 implements process 200 illustrated in FIG. 2. It should be appreciated that the structure and operation of data processing environment 100 may differ in other examples.

FIG. 2 illustrates process 200. Process 200 comprises a data pipeline monitoring process. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 include monitoring the operations of a data pipeline that receives data inputs, processes the data inputs, and responsively generates and transfers the data outputs (step 201). The operations continue with identifying an input change between an initial one of the data inputs and a subsequent one of the data inputs (step 202). The operations continue with identifying an output change between an initial one of the data outputs and a subsequent one of the data outputs (step 203). The operations continue by correlating the input change to the output change (step 204). The operations continues by determining a quality threshold for the output change based on the correlation (step 205). The operations continues by determining when the output change falls below the quality threshold (step 206). The operations continue with generating an alert that indicates the input change and the output change when the output change falls below the quality threshold (step 207). The operations continue with transferring the alert (step 208).

Referring back to FIG. 1, data processing environment 100 includes a brief example of process 200 as employed by one or more applications hosted by computing device 132 and data pipeline 113. The operation may differ in other examples.

Data pipeline 113 receives pipeline inputs 112 generated by data source 101. For example, data source 101 may comprise an online transaction service which generates financial data and transfers the financial data to data pipeline system 111 to form pipeline inputs 112. Data pipeline 113 ingests data inputs 112 and copies data inputs 112 to data monitoring system 131. For example, data pipeline 113 may copy a data stream comprising data inputs 112 to computing device 132 in monitoring system 131. Data pipeline 113 processes the unprocessed data set and responsively generates a pipeline outputs 114. For example, data pipeline 113 may execute a series of data processing steps to transform pipeline inputs 112 into a standardized form configured for data target 121. Data pipeline 113 copies pipeline outputs 114 to computing device 132 in monitoring system 131. For example, data pipeline 113 may call computing device 132 to ingest pipeline outputs 114. Computing device 132 may comprise an Application Programming Interface (API) to facilitate communication with data pipeline 113. Data pipeline 113 also transfers pipeline outputs 114 to data target 121. Data target 121 receives and stores pipeline outputs 114.

Computing device 132 receives pipeline inputs 112 and pipeline outputs 114 from data pipeline 113 to monitor the operations of data pipeline system 111 (step 201). Pipeline control module 134 is hosted by computing device 132. Pipeline control module 134 determines the type, format, schema, shape, and/or some other data attribute of pipeline inputs 112. Over time, pipeline control module 134 identifies and tracks changes between ones of pipeline inputs 112 (step 202). For example, pipeline inputs 112 may comprise a series of discreet data sets ingested by pipeline 113. Pipeline control module 134 identifies changes in the data types (e.g., strings and the like), formats, schemas, values, probability distribution shapes, and/or other attributes between different ones of the discreet data sets that comprise pipeline inputs 112. Likewise, pipeline control module 134 identifies and tracks changes between ones of pipeline outputs 114 (step 203). For example, pipeline outputs 114 may also comprise a series of discreet data sets output by pipeline 113. The discreet data sets that comprise pipeline inputs 112 and pipeline outputs 114 may correspond to periods of time like days or weeks. Pipeline control module 134 identifies changes in the data types, formats, schemas, values, shapes, and/or other attributes between different ones of the discreet data sets that comprise pipeline inputs 114.

Pipeline control module 134 correlates the identified changes in pipeline inputs 112 data with the identified changes in pipeline outputs 114 (step 204). For example, pipeline control module 134 may identify a change between consecutive sets of pipeline inputs 112 and correlate the observed change to a change between corresponding consecutive sets of pipeline outputs 114. The consecutive sets may correspond based on dates of operation of data pipeline 113. Generally, data pipeline 113 is configured to operate using a defined input form of pipeline inputs 112 to generate pipeline outputs 114 with a desired format. When the format of pipeline inputs 112 is altered (e.g., a schema change or data type change) without a corresponding change to the processing operations of data pipeline 113, pipeline outputs 114 can become malformed (e.g., undesired schema change). The changes in pipeline inputs 112 and outputs 114 may comprise changes in data volume, changes in data schema, changes in data values, changes in data types, changes in data density, and the like. By correlating the identified changes in pipeline inputs 112 and pipeline outputs 114, pipeline control module 134 can construct a data lineage for data pipeline 113 that indicates when and how and pipeline inputs 112 and pipeline outputs 114 change over time. Pipeline control module 134 display the data inputs, data outputs, and correlated changes on user interface 133.

Pipeline control module 134 determines a quality threshold for observed changes in the output data based on the correlations (step 205). The threshold defines an acceptable level of change in pipeline outputs 114. For example, the threshold may comprise a data entropy limit for individual ones of the pipeline outputs 114. Data entropy comprises the average level of uncertainty for a data set's possible values. Pipeline control module 134 applies the quality threshold to pipeline outputs 114 to determine when an output change falls below the quality threshold (step 206). For example, pipeline control module 134 may apply the quality threshold to one of the data sets that comprises pipeline outputs 114 to determine if that data set comprises an acceptable level of data entropy. Typically, a change in the pipeline inputs 112 that adversely affects a portion of pipeline outputs 114 will fall below the quality threshold while a change in pipeline inputs 112 that does not affect, or marginally affects pipeline outputs 114 will not fall below the quality threshold. In other examples, a transfer function in data pipeline 113 may have changed while inputs 112 remain unchanged. The change in the transfer function may result in a change in pipeline outputs 114. Pipeline control module 134 may determine a change has occurred in pipeline outputs 114 without a corresponding change in pipeline inputs 112. In response, pipeline control module 134 may identify a problem has in the transfer function of data pipeline 113.

When a change in pipeline outputs 114 triggers the quality threshold, pipeline control module 134 generates an alert (step 208). The alert indicates the output data set of pipeline outputs 114 that triggered the threshold, the corresponding output change, and the change in pipeline inputs 112 that causes the output change. The alert may further indicate when a change in pipeline outputs 114 has occurred without a corresponding change in pipeline inputs 112 and indicate that the change that altered outputs 114 resides in data pipeline 113. When an output difference does not trigger a threshold, pipeline control module 134 does generate an alert. Pipeline control module 134 displays the alert on user interface 133. Pipeline control module 134 transfers the alert to data pipeline system 111 to notify pipeline operators. For example, pipeline control module 134 may drive transceiver circuitry in computing device 132 to transfer the alert.

Advantageously, monitoring system 131 efficiently maintains data lineage for data pipeline system 111. Moreover, monitoring system 131 effectively correlates changes in pipeline inputs with pipeline outputs to identify when adverse changes occur in the pipeline outputs.

Figure 3:
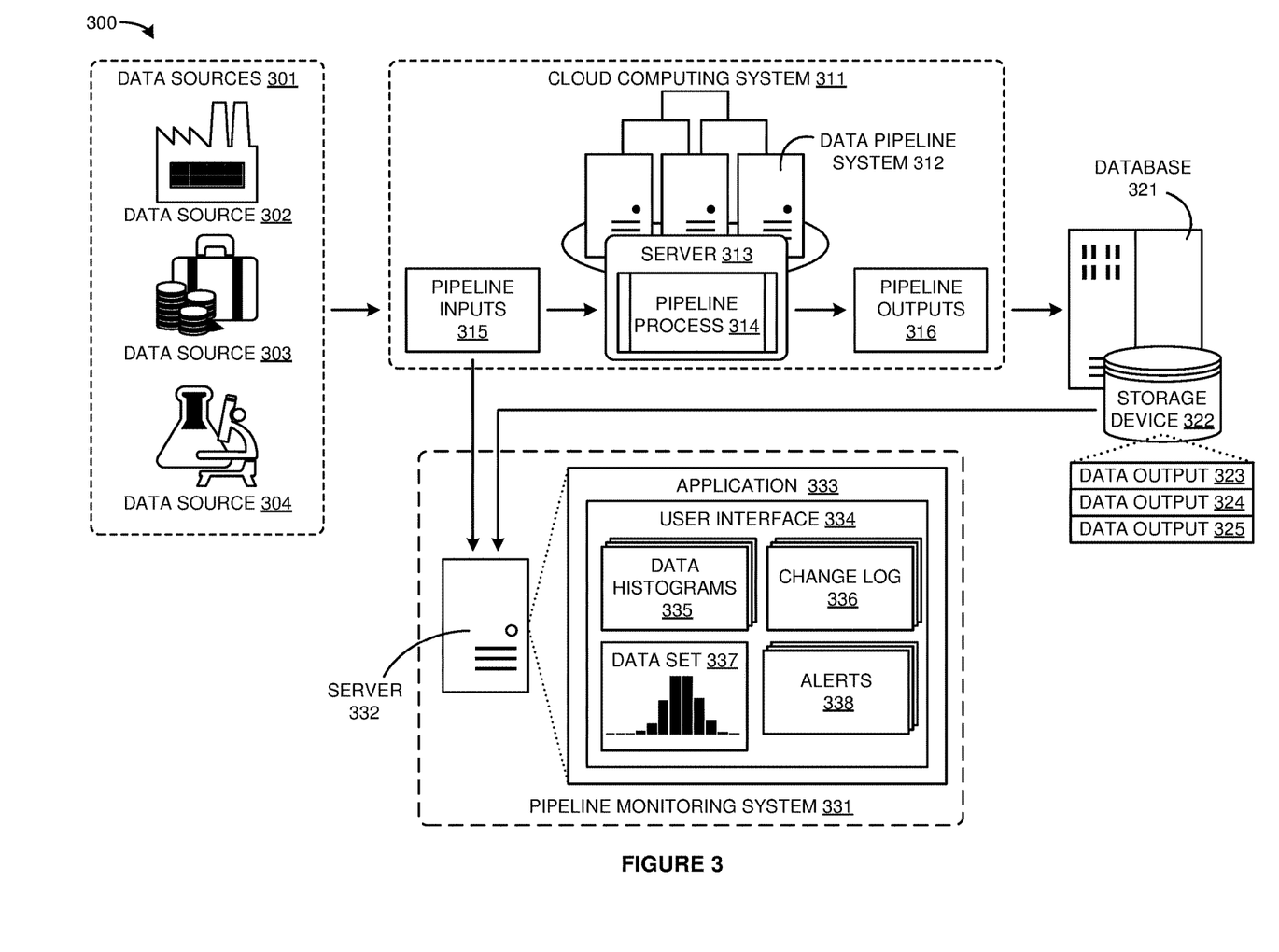
FIG. 3 illustrates an exemplary data processing environment to monitor operations of a data pipeline.

FIG. 3 illustrates data processing environment 300 to monitor operations of a data pipeline. Data processing environment 300 is an example of data processing environment 100, however data processing environment 100 may differ. Data processing environment 300 comprises data sources 301, cloud computing system 311, database 321, and pipeline monitoring system 331. Data sources 301 comprises data sources 302-304. Cloud computing system 311 comprises data pipeline system 312, server 313, pipeline process 314, pipeline inputs 315, and pipeline outputs 316. Database 321 comprises storage device 322 and data outputs 323-324. Pipeline monitoring system 331 comprises server 332, application 333, user interface 334, data histograms 335, change log 336, data set 337, and alerts 338. In other examples, data processing environment 300 may include fewer or additional components than those illustrated in FIG. 3. Likewise, the illustrated components of data processing environment 300 may include fewer or additional components, assets, or connections than shown. Each of data sources 301, cloud computing system 311, storage system 321, and/or pipeline monitoring system 331 may be representative of a single computing apparatus or multiple computing apparatuses.

Data sources 301 is representative of one or more computing devices configured to generate input data configured for ingestion by data pipeline system 312. Data sources 301 comprises individual data sources 302-304. Individual data sources 302-304 may produce industrial data, financial data, scientific data, machine learning data, and/or other types of input data for consumption by data pipeline system 312. Typically, the input data generated by data sources 301 is not-suitable for end user consumption (e.g., storage in database 321) and requires data processing by data pipeline system 312. It should be appreciated that the types of data sources that comprise data sources 301 and the input data generated data sources 301 are not limited.

Cloud computing system 311 is representative of a data processing environment configured to receive and process input data from data sources 301. Cloud computing system 311 is an example of data pipeline system 111, however system 111 may differ. Cloud computing system 311 comprises data pipeline system 312, pipeline inputs 315, and pipeline outputs 316. Data pipeline system 312 is representative of one or more computing devices integrated into a network that communicates with data sources 301, database 321, and pipeline monitoring system 331. Examples of data pipeline system 312 may include server computers and data storage devices deployed on-premises, in the cloud, in a hybrid cloud, or elsewhere, by service providers such as enterprises, organizations, individuals, and the like. Data pipeline system 312 may rely on the physical connections provided by one or more other network providers such as transit network providers, Internet backbone providers, and the like to communicate with data sources 301, database 321, and/or pipeline monitoring system 331. Data pipeline system 312 comprises server computer 313 which hosts pipeline process 314.

Server computer 313 comprises processors, bus circuitry, storage devices, software, and the like configured to host pipeline process 314. The processors may comprise CPUs, GPUs, ASICs, FPGAs, and the like. The storage devices comprise flash circuitry, RAM, HDDs, SSDs, NVMe SSDs, and the like. The storage devices store the software. The processors may retrieve and execute software stored on the storage devices to drive the operation of pipeline process 314.

Server computer 313 hosts pipeline process 314. Pipeline process 314 comprises one or more data processing algorithms configured to transform pipeline inputs 315 into pipeline outputs 316. The data processing algorithms may comprise one or more transform functions configured to operate on pipeline inputs 315. The transform functions may be executed by the processors of server 313 on pipeline inputs 315 and responsively generate pipeline outputs 316. Pipeline inputs 315 comprise data generated by data sources 301. Pipeline outputs 316 comprise data emitted by pipeline process 314. For example, pipeline process 314 may comprise a data cleaning process that transforms pipeline inputs 315 into pipeline outputs 316 suitable for storage in database 321. The cleaning process may comprise reformatting, redundancy removal, or some other type of operation to standardize pipeline inputs 315. It should be appreciated that pipeline process 314 is exemplary and the specific data processing operations implemented by pipeline process 314 are not limited.

In some examples, pipeline process 314 may comprise a machine learning model where pipeline inputs 315 represent machine learning inputs and pipeline outputs 316 represent machine learning outputs. The machine learning model may comprise one or more machine learning algorithms trained to implement a desired process. Some examples of machine learning algorithms include artificial neural networks, nearest neighbor methods, ensemble random forests, support vector machines, naïve Bayes methods, linear regressions, or other types of machine learning algorithms that predict output data based on input data. In this example, pipeline inputs 315 may comprise feature vectors configured for ingestion by the one or more machine learning algorithms and pipeline outputs 316 may comprise machine learning decisions.

Database 321 comprises storage device 322 and is representative of a data target for pipeline process 314. Database 321 is an example of data target 121, however data target 121 may differ. Database 321 comprises processors, bus circuitry, storage devices (including storage device 322), software, and the like configured to store output data sets 323-325. The processors may comprise CPUs, GPUs, ASICs, and the like. The storage devices comprise flash drives, RAM, HDDs, SSDs, NVMe SSDs, and the like. The processors may retrieve and execute software stored upon the storage devices to drive the operation of database 321. Storage device 322 receives and stores pipeline outputs 316 receives and stores from pipeline process 314. Storage device 322 may implement a data structure that categorizes and organizes pipeline outputs 316 according to a data storage scheme. For example, output data sets 323-325 may be organized by data, size, point of origin, and/or any other suitable data storage scheme. Database 321 may comprise user interface systems like displays, keyboards, touchscreens, and the like that allows a human operator to view the output data sets 323-325 stored upon storage device 322. The user interface systems may allow a human operator to review, select, and transfer ones of data outputs 323-325 to pipeline monitoring system 331.

Pipeline monitoring system 331 is representative of one or more computing devices integrated into a network configured to monitor the operation of data pipeline system 312. Pipeline monitoring system 331 is an example of monitoring system 131, however system 131 may differ. Pipeline monitoring system 331 comprises server computer 332. Server computer 332 comprises one or more computing devices configured to host application 333. Server 332 is communicatively coupled to cloud computing system 311 and database 321 to receive pipeline inputs 315 and pipeline outputs 316. The one or more computing devices that comprise server 332 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of application 333.

Application 333 is representative of one or more pipeline monitoring applications user interface applications, operating systems, modules, and the like. Application 333 is configured to receive input and output data sets from data pipeline system 312, maintain data lineage for the input and output data, correlate changes in the inputs to changes in the outputs, and generate alerts indicating the changes.

User interface 334 is representative of a display that provides a graphical representation of application 333. The graphical representation on user interface 334 includes data histograms 335, change log 336, data set 337, and alerts 338. In other examples, the graphical representation may include additional or different types of visual indicators relevant to the operation and status of data pipeline system 312. Data histograms 335 comprise a set of histograms that characterize pipeline inputs and pipeline outputs 316. For example, data histograms may comprise histograms that categorize value distributions, data entropy, schema types, or other types of data to characterize pipeline inputs 315 and pipeline outputs 316. Change log 336 comprises data lineage information that indicates relationships between pipeline inputs 315 and pipeline outputs 316. For example, change log 336 may track changes to that input data sets that comprise pipeline inputs 315 and correlated changes to the output data sets that comprise pipeline outputs 316 to illustrate how data associated with pipeline process 314 changes over time. Data set 337 comprises a visual representation of pipeline inputs 315 and pipeline outputs 316. The visual representation may comprise probability distributions, data volumes, histograms, and the like for pipeline inputs 315 and pipeline outputs 316. Alerts 338 comprise notifications indicating when adverse changes occur in pipeline outputs 316 as well as corresponding changes to pipeline inputs 315 that resulted in the adverse changes.

User interface 334 may include a computer, a display, a mobile device, a touchscreen device, or some other type of computing device capable of performing the user interface functions described herein. A user may interact with application 333 via user interface 334 to generate, view, and interact with data histograms 335, change log 336, data set 337, and alerts 338. For example, a user may interact with a selectable option on user interface 336 to view change log 336 and access alerts 338.

Figure 4:
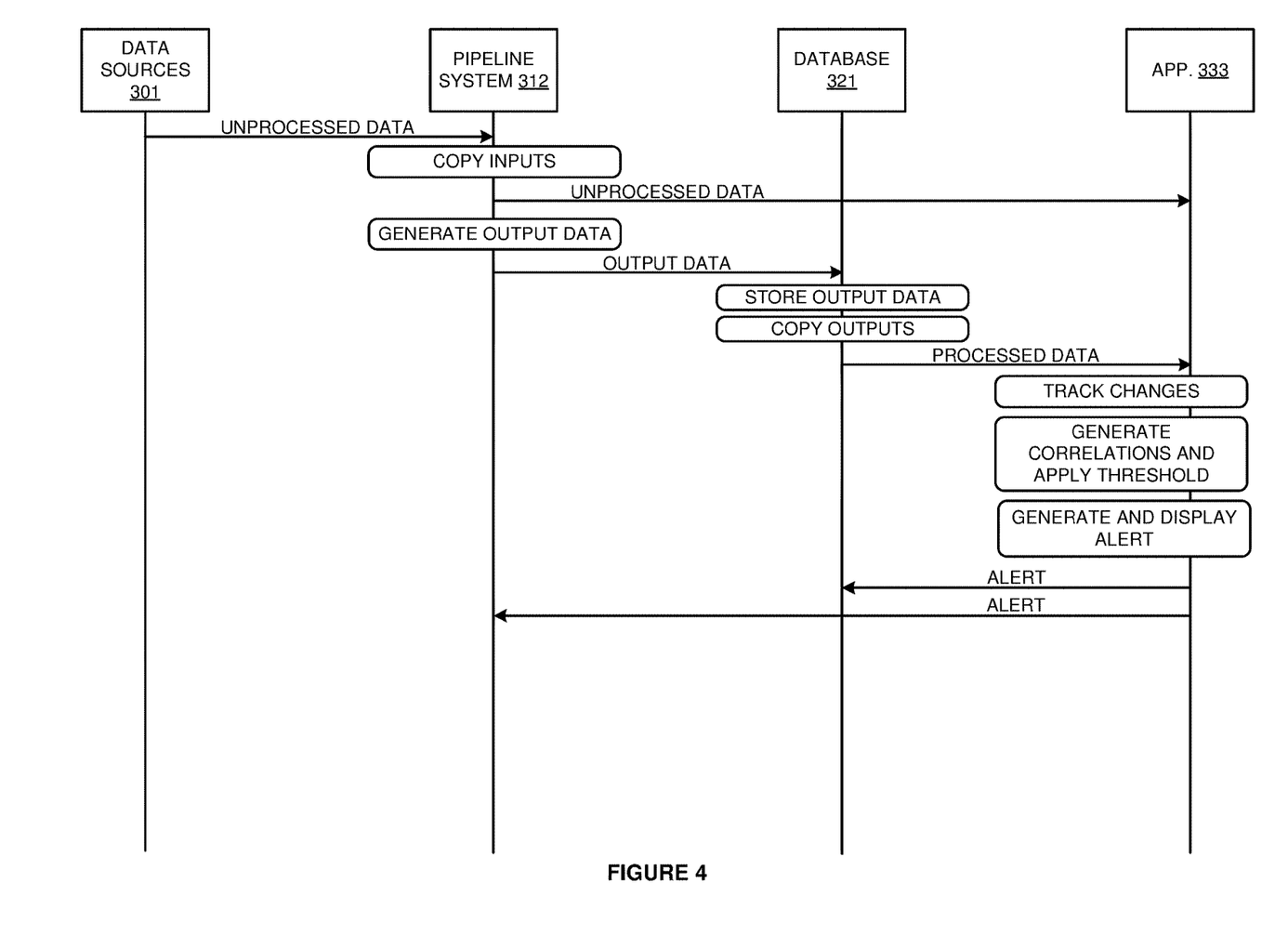
FIG. 4 illustrates an exemplary operation to monitor operations of a data pipeline.

FIG. 4 illustrates an exemplary operation of data processing environment 300 to monitor the operations of data pipeline system 312. The operation depicted by FIG. 4 comprises an example of process 200 illustrated in FIG. 2, however process 200 may differ. In other examples, the structure and operation of data processing environment 300 may be different.

In operation, data sources 301 transfer unprocessed data to data pipeline 312. For example, data sources 301 may generate user subscription data and transfer the user subscription data to pipeline system 312 for processing. Data pipeline system 312 receives the unprocessed data as pipeline inputs 315. Data pipeline system 312 copies the input data steam comprising pipeline inputs 315 to server 332 in monitoring system 331. Data pipeline system 312 ingests pipeline inputs 315 and implements pipeline process 314. Pipeline process 314 cleans, transforms, applies a schema, or otherwise processes pipeline inputs 315 into a consumable form to generate pipeline outputs 316. Data pipeline system 312 transfers pipeline outputs 316 to database 321. Database 321 receives pipeline outputs 316 as output data and stores the output data in storage device 322. Database 321 copies the output data stream comprising pipeline outputs 316 to server 332.

Application 333 hosted by server computer 332 receives the copied input data stream comprising pipeline inputs 315 and the copied output data stream comprising pipeline outputs 316. Application 333 tracks the changes between individual data sets that comprise pipeline inputs 315 and tracks the changes between individual data sets that comprise pipeline inputs 315. For example, application 333 may identify a change between consecutive input data sets of pipeline inputs 315 ingested by data pipeline system 312. The tracked changes may comprise alterations in value distributions, schemas, types, volumes, and the like for pipeline inputs 315 and pipeline outputs 316. Application 333 correlates observed changes in pipeline inputs 315 with observed changes in pipeline outputs 316. For example, data pipeline system 312 may ingest an input data set of pipeline inputs 315 on a date and generate a corresponding output data set of pipeline outputs 316 associated with that particular date. Application 333 may identify a change to the input set and a corresponding change in the resulting output set and responsively correlate the input and resulting output changes. Application 333 additionally correlates observed changes in pipeline outputs 316 to changes in pipeline process 314 when no changes are observed in pipeline inputs 315. For example, data volume of pipeline inputs 315 may remain constant while an increase in data volume of pipeline outputs 316 is observed and application 333 may correlate the data volume change in outputs 316 to a change in pipeline process 314.

Application 333 generates histograms 335 to visually and statistically depict pipeline inputs 315 and pipeline outputs 316 and displays the tracked changes on user interface 334 as change log 336. Change log 336 provides a data lineage of pipeline inputs 315 and pipeline outputs 316 that illustrates how inputs 315 and outputs 316 change over time. Change log 336 additionally details correlated changes in pipeline inputs 315 and pipeline outputs 316. For example, the correlation may indicate the data volume of pipeline inputs 315 increased which led to a corresponding increase in data volume of pipeline outputs 316. For example, the correlation may indicate the data volume of pipeline inputs 315 remained constant while an increase in data volume of pipeline outputs 316 was observed suggesting a change occurred within pipeline process 314. Application 333 applies a quality threshold to pipeline outputs 316 to identify changes in pipeline outputs 316 that adversely affect pipeline outputs 316. For example, application 333 may use a data density-based quality threshold. Data density describes the proportion of records in a data set that have values for an attribute. For example, if only half the total number of records in a data object have a non-null value, then the data density value is 50%. Application 333 determines the density of data outputs 316 over time to identify when adverse changes in the input data occur and/or adverse changes in pipeline process 114 occur. Application 333 may determine a probability distribution for ones of pipeline outputs 316. Application 333 determines the data density for the data sets of pipeline outputs 316 based on probability distributions. For example, the application may utilize a mathematic algorithm to calculate the density for probability distributions. The data processing circuitry generates histograms that depict the density for the output data sets of pipeline outputs 316. Application 333 compares the histograms to track the density of pipeline outputs over time. When the density of the output data falls below a threshold value dictated by the quality threshold, application 333 identifies a data set of pipeline outputs 316 that exhibited an unacceptable amount of change. Other applicable threshold metrics that application 333 may use to detect adverse change in pipeline outputs 316 include mean, median, standard deviation, and the like. For example, application 333 may calculate medians for data set values in pipeline outputs 316 to track and identify changes in pipeline outputs 316.

In some examples, Application 333 does not calculate the density of the pipeline outputs 316 and instead implements a different technique to determine correlations and identify adverse changes. For example, the output data sets of pipeline outputs 316 may comprise a data type not suitable for density calculations. Application 333 may receive the output data sets and identifies the data type of the output data sets. For example, the output data sets may comprise simplistic categories of integers. Application 333 determines that the output data sets are not suitable for density calculations based on the data type (or some other metric) of the output data sets. In response, the application 333 selects an alternative data metric to correlate changes in the output data set to changes in the input data sets. For example, application 333 may correlate average integer value changes in the output data sets to changes in the input data sets.

Application 333 determines when a data set of pipeline outputs 316 falls below the quality threshold. When application 333 determines when a data set of pipeline outputs 316 falls below the quality threshold, application 333 generates alerts 338. Alerts 338 indicate the output data set of pipeline outputs 316 that fell below the quality threshold, the change in the data set that caused the data set to fall below the quality threshold, and the change in the input data set of pipeline inputs 315. Alerts 338 may include additional information that identifies the date of operation the change occurred and how severe the change was (e.g., observed entropy). Application 333 transfers alerts 338 to pipeline system 312 and data base 321 to notify pipeline and database operators to respond to the adverse change in pipeline outputs 316.

Figure 5:
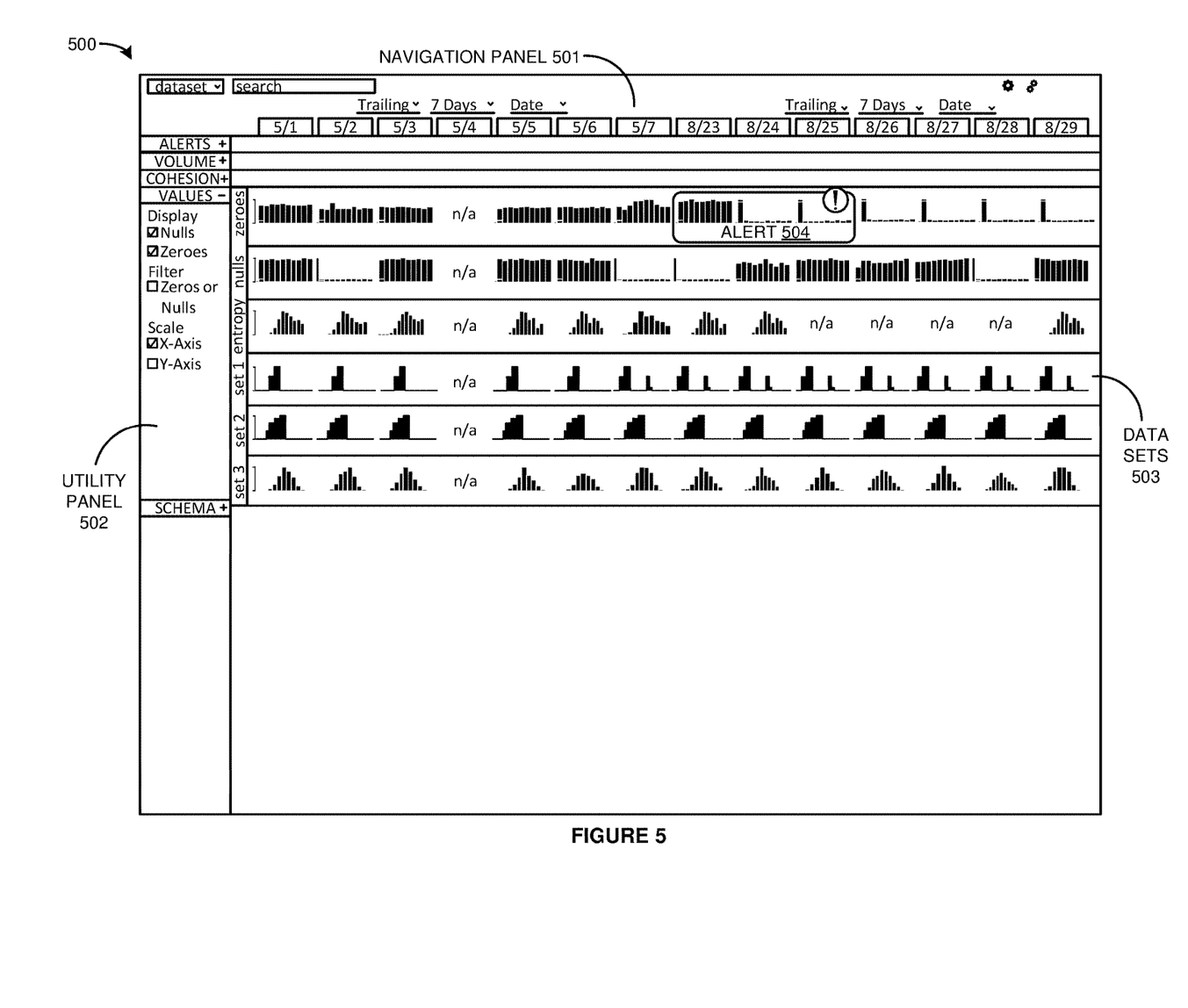
FIG. 5 illustrates an exemplary user interface to facilitate monitoring operations of a data pipeline.

FIG. 5 illustrates user interface 500 to monitor the operation of a data pipeline. User interface 500 comprises an example of user interface 133 and user interface 334, however user interface 133 and user interface 334 may differ. User interface 500 comprises a pipeline monitoring application presented on a display screen which is representative of any user interface for monitoring the operation of a data pipeline. For example, user interface 501 may comprise a Guided User Interface (GUI) configured to allow a user to maintain data lineage in for a data pipeline and identify when adverse changes occur to the outputs of the data pipeline.

User interface 500 includes navigation panel 501. Navigation panel 501 comprises tabs like "dataset" and "search" that allows a user to find and import data sets into user interface 500. For example, a user may interact with the "dataset" tab to import a data set from a data pipeline system. Navigation panel 501 also includes date range options to select data sets from a period of time. In this example, a user has selected to view a data set over two different weeks ranging from May $1^{st}$ to May $7^{th}$ and from August $23^{rd}$ to August $29^{th}$. In other examples, a user may select a different date range and/or a different number of days.

User interface 500 includes utility panel 502. Utility panel 502 comprises tabs labeled "ALERTS", "VOLUME", "COHESION", "VALUES", and "SCHEMA". In other examples, utility panel 502 may comprise different tabs than illustrated in FIG. 5. When a user selects one or the tabs, the tab expands to reveal its contents. In this example, a user has opened the "VALUES" tab. The "VALUES" tab comprises data sets 503. The "ALERTS" tab also includes display options to modify the view of data sets 503. The display options include toggles labeled "Nulls", "Zeroes", "Zeroes or Nulls", "X-Axis", and "Y-Axis". In other examples, the display options may differ.

User interface 500 includes data sets 503. Data sets 503 comprises histogram visualizations of data sets imported into user interface 500. In this example, data sets 504 include "zeroes", "nulls", "entropy", "set 1", "set 2", and "set 3". Each data set of data sets 504 corresponds to the date selected by a user in navigation panel 501. For example, the "zeroes" data set of data sets 503 is presented as a row with each portion of the set corresponding to the dates presented in navigation panel 501. Data sets 503 allows a user to view the shape and/or other attributes of the imported data sets. Data sets 503 provides a data lineage for a data pipeline system to illustrate how data sets change over time.

User interface 500 includes alert 504. Alert 504 comprises a user selectable option. In this example, alert 504 indicates the pipeline monitoring application visualized by user interface 500 detected a change in the zeroes data set for the dates August 23-August 25 that triggered a quality threshold. For example, the pipeline monitoring application may have determined the data entropy for the zeroes data set has fallen below an acceptable quality threshold. A user may select alert 504 to view additional information relating to the detected issue in the zeroes data set.

Figure 6:
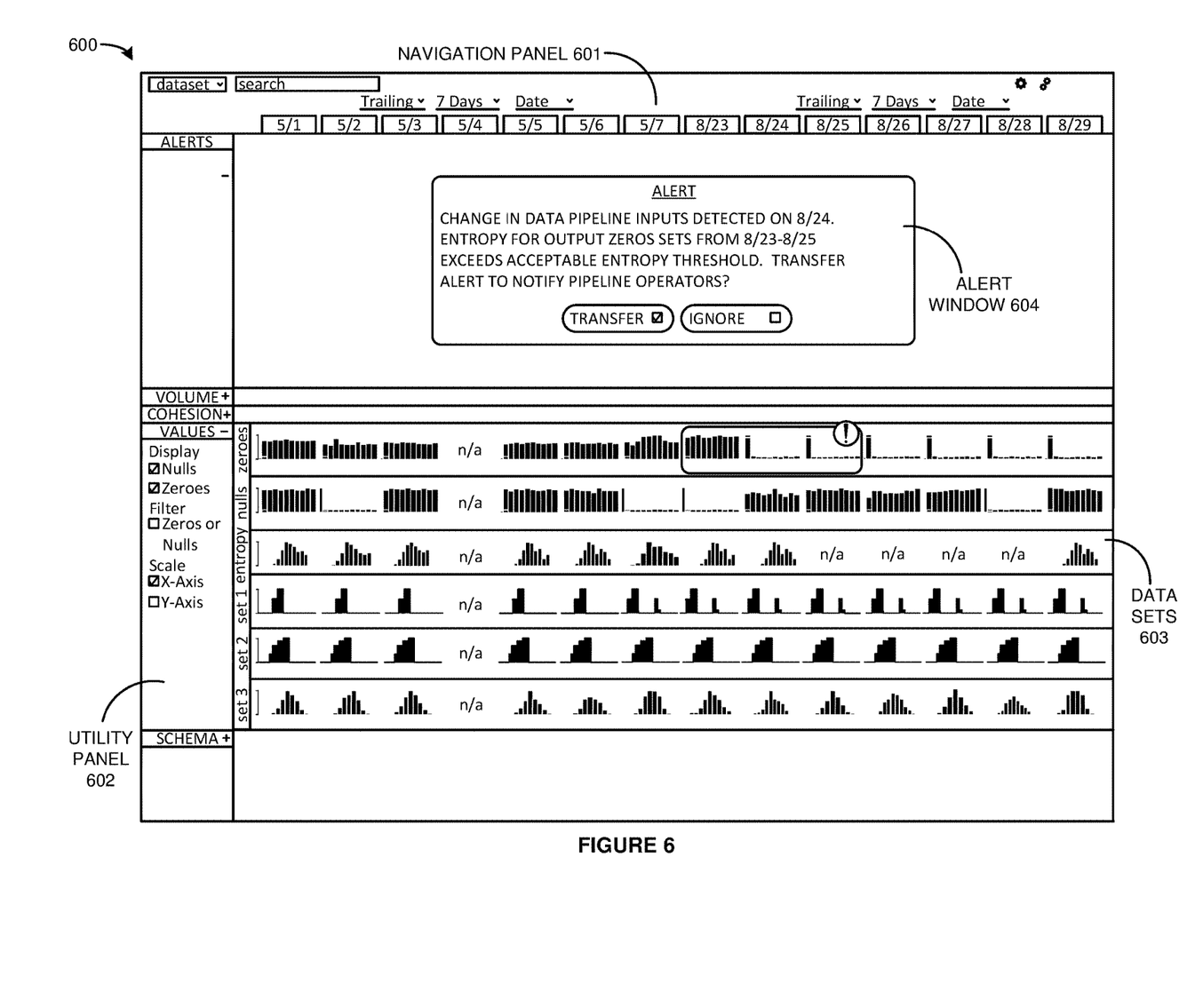
FIG. 6 illustrates an exemplary user interface to facilitate monitoring operations of a data pipeline.

FIG. 6 illustrates user interface 600 to monitor the operation of a data pipeline. User interface 600 comprises an example of user interface 133 and user interface 334, however user interface 133 and user interface 334 may differ. User interface 600 comprises a pipeline monitoring application presented on a display screen which is representative of any user interface for monitoring the operation of a data pipeline. User interface 600 represents a continuation of operations of user interface 500 presented in FIG. 5.

User interface 600 includes navigation panel 601. Navigation panel 601 comprises tabs like "dataset" and "search" that allows a user to find and import data sets into user interface 600. For example, a user may interact with the "dataset" tab to import a data set from a data pipeline system. Navigation panel 601 also includes date range options to select data sets from a period of time. In this example, a user has selected to view a data set over two different weeks ranging from May $1^{st}$ to May $7^{th}$ and from August $23^{rd}$ to August $29^{th}$. In other examples, a user may select a different date range and/or a different number of days.

User interface 600 includes utility panel 602. Utility panel 602 comprises tabs labeled "ALERTS", "VOLUME", "COHESION", "VALUES", and "SCHEMA". In other examples, utility panel 602 may comprise different tabs than illustrated in FIG. 6. When a user selects one or the tabs, the tab expands to reveal its contents. In this example, a user has opened the "ALERTS" tab and the "VALUES" tab. The "ALERTS" tab comprises alert window 604 and the "VALUES" tab comprises data sets 603. The "ALERTS" tab also includes display options to modify the view of data sets 603. The display options include toggles labeled "Nulls", "Zeroes", "Zeroes or Nulls", "X-Axis", and "Y-Axis". In other examples, the display options may differ.

User interface 600 includes data sets 603. Data sets 603 comprises visualizations of data sets imported into user interface 600. In this example, data sets 604 include "zeroes", "nulls", "entropy", "set 1", "set 2", and "set 3". Each data set of data sets 604 corresponds to the date selected by a user in navigation panel 601. For example, the "zeroes" data set of data sets 603 is presented as a row with each portion of the set corresponding to the dates presented in navigation panel 601. The data sets of data sets 603 may comprise histograms, probability distributions, or other types of plots to visually illustrate the operations of a data pipeline. Data sets 603 allows a user to view the shape and/or other attributes of the imported data sets.

User interface 600 includes alert window 604. Alert window 604 may be generated and presented in response to selection of alert notification 504 illustrated in FIG. 5. Alert window 604 comprises an alert that indicates that a change was detected in data pipeline inputs which caused the entropy for corresponding outputs exceeds an acceptable standard. In the example, alert window 604 indicates. Alert window 604 comprises options labeled "TRANSFER" and "IGNORE". Selecting the "TRANSFER" option may cause the application to forward alert 604 to pipeline operators. Selecting the "IGNORE" option may cause the application to close alert window 604. In this example, a user has selected the "TRANSFER" option to transfer alert 604 to data pipeline operators.

Figure 7:
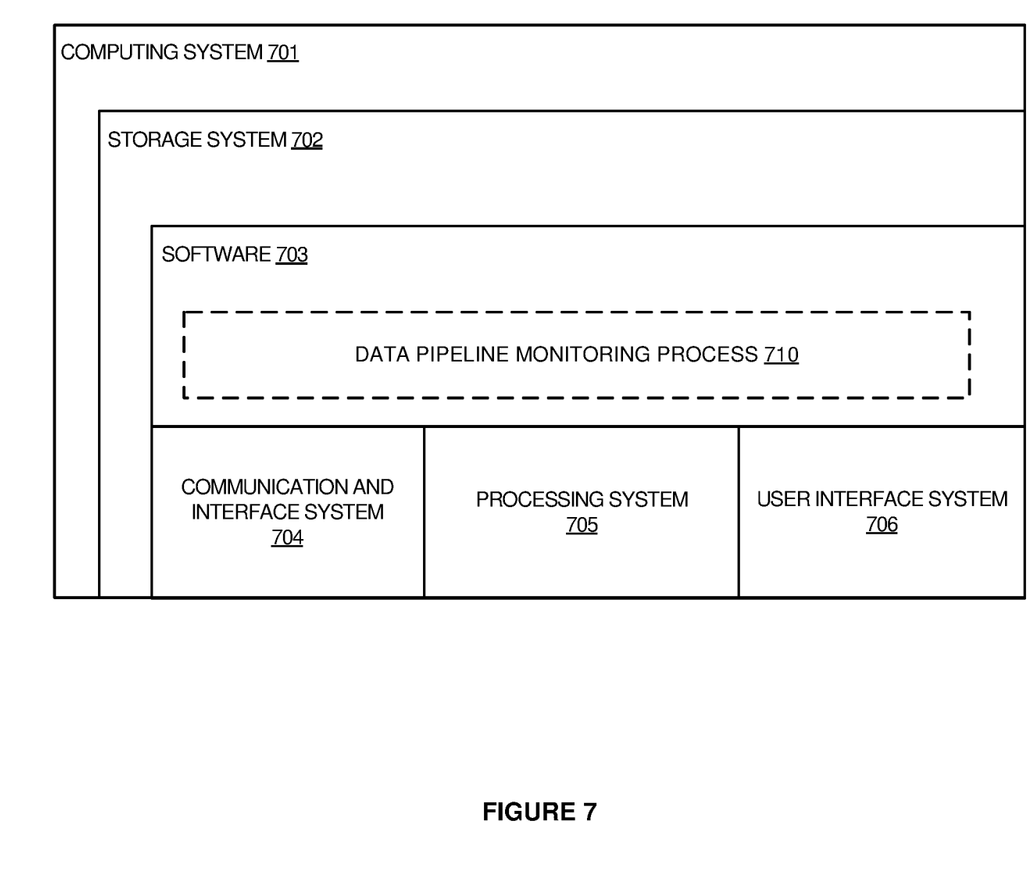
FIG. 7 illustrates an exemplary computing device that may be used in accordance with some embodiments of the present technology.

FIG. 7 illustrates computing device 701 which is representative of any system or collection of systems in which the various processes, programs, services, and scenarios disclosed herein for monitoring the operations of data pipelines within data processing environments may be implemented. For example, computing device 701 may be representative of data pipeline system 111, data target 121, computing device 132, user interface 133, cloud computing system 311, database 321, server 332, user interface 500, and/or user interface 600. Examples of computing system 701 include, but are not limited to, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, storage system 702, software 703, communication and interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements data pipeline monitoring process 710, which is representative of the data pipeline monitoring processes discussed with respect to the preceding Figures. For example, process 710 may be representative of process 200 illustrated in FIG. 2 and/or the exemplary operation of environment 300 illustrated in FIG. 4. When executed by processing system 705, software 703 directs processing system 705 to operate as described herein for at least the various processes, operational scenarios, and sequences discussed in the foregoing implementations. Computing system 701 may optionally include additional devices, features, or functionality not discussed here for purposes of brevity.

Processing system 705 may comprise a micro-processor and other circuitry that retrieves and executes software 703 from storage system 702. Processing system 705 may be implemented within a single processing device but may also be distributed across multiple processing devices or subsystems that cooperate in executing program instructions. Examples of processing system 705 include general purpose central processing units, graphical processing units, application specific processors, and logic devices, as well as any other type of processing device, combinations, or variations thereof.

Storage system 702 may comprise any computer readable storage media that is readable by processing system 705 and capable of storing software 703. Storage system 702 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (data pipeline monitoring process 710) may be implemented in program instructions and among other functions may, when executed by processing system 705, direct processing system 705 to operate as described with respect to the various operational scenarios, sequences, and processes illustrated herein. For example, software 703 may include program instructions for implementing a data monitoring process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to maintain data pipeline lineage as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of a data pipeline monitoring computing device, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data pipeline monitoring system configured to monitor data quality in a data pipeline, the data pipeline monitoring system comprising:
    data monitoring circuitry configured to monitor operations of the data pipeline, wherein the data pipeline receives data inputs, processes the data inputs, responsively generates data outputs, and transfers the data outputs;
    the data monitoring circuitry configured to identify an input change between an initial one of the data inputs and a subsequent one of the data inputs, and identify an output change between an initial one of the data outputs and a subsequent one of the data outputs;
    the data monitoring circuitry configured to correlate the input change to the output change, determine a quality threshold for the output change based on the correlation, and determine when the output change falls below the quality threshold; and
    when the output change falls below the quality threshold, the data monitoring circuitry configured to generate and transfer an alert that indicates the input change and the output change.

2. The data pipeline monitoring system of claim 1 wherein:
    the output change comprises a data volume change between the initial one of the data outputs and the subsequent one of the data outputs; and wherein:
    the data monitoring circuitry is configured to correlate the input change to the output change comprises the data monitoring circuitry configured to correlate the input change to the data volume change.

3. The data pipeline monitoring system of claim 1 wherein:
the output change comprises a data schema change between the initial one of the data outputs and the subsequent one of the data outputs; and wherein:
the data monitoring circuitry is configured to correlate the input change to the output change comprises the data monitoring circuitry configured to correlate the input change to the data schema change.

4. The data pipeline monitoring system of claim 1 wherein:
the output change comprises a data value change between the initial one of the data outputs and the subsequent one of the data outputs; and wherein:
the data monitoring circuitry is configured to correlate the input change to the output change comprises the data monitoring circuitry configured to correlate the input change to the data value change.

5. The data pipeline monitoring system of claim 1 wherein:
the output change comprises a data type change between the initial one of the data outputs and the subsequent one of the data outputs; and wherein:
the data monitoring circuitry is configured to correlate the input change to the output change comprises the data monitoring circuitry configured to correlate the input change to the data type change.

6. The data pipeline monitoring system of claim 1 wherein the data monitoring circuitry is configured to identify the output change comprises the data monitoring circuitry configured to generate a histogram for the initial one of the data outputs, generate another histogram for the subsequent one of the data outputs, and identify the output change based on a difference between the histogram and the other histogram.

7. The data pipeline monitoring system of claim 6 wherein:
the histogram depicts data density for the initial one of the data outputs;
the other histogram represents data density for the subsequent one of the data outputs;
the data monitory circuitry is configured to identify the output change comprises the data monitory circuitry configured to identify the output change based on a difference between the data density for the initial one of the data outputs and the data density for the subsequent one of the data outputs.

8. A method of operating a data pipeline monitoring system to monitor data quality in a data pipeline, the data processing system comprising:
data monitoring circuitry monitoring operations of the data pipeline, wherein the data pipeline receives data inputs, processes the data inputs, responsively generates data outputs, and transferring the data outputs;
the data monitoring circuitry identifying an input change between an initial one of the data inputs and a subsequent one of the data inputs, and identifying an output change between an initial one of the data outputs and a subsequent one of the data outputs;
the data monitoring circuitry correlating the input change to the output change, determining a quality threshold for the output change based on the correlation, and determining when the output change falls below the quality threshold; and when the output change falls below the quality threshold, the data monitoring circuitry generating and transferring an alert that indicates the input change and the output change.

9. The method of claim 8 wherein:
the output change comprises a data volume change between the initial one of the data outputs and the subsequent one of the data outputs; and wherein:
the data monitoring circuitry correlating the input change to the output change comprises the data monitoring circuitry correlating the input change to the data volume change.

10. The method of claim 8 wherein:
the output change comprises a data schema change between the initial one of the data outputs and the subsequent one of the data outputs; and wherein:
the data monitoring circuitry correlating the input change to the output change comprises the data monitoring circuitry correlating the input change to the data schema change.

11. The method of claim 8 wherein:
the output change comprises a data value change between the initial one of the data outputs and the subsequent one of the data outputs; and wherein:
the data monitoring circuitry correlating the input change to the output change comprises the data monitoring circuitry correlating the input change to the data value change.

12. The method of claim 8 wherein:
the output change comprises a data type change between the initial one of the data outputs and the subsequent one of the data outputs; and wherein:
the data monitoring circuitry correlating the input change to the output change comprises the data monitoring circuitry correlating the input change to the data type change.

13. The method of claim 8 wherein the data monitoring circuitry identifying the output change comprises the data monitoring circuitry generating a histogram for the initial one of the data outputs, generating another histogram for the subsequent one of the data outputs, and identifying the output change based on a difference between the histogram and the other histogram.

14. The method of claim 13 wherein:
the histogram represents data density for the initial one of the data outputs;
the other histogram represents data density for the subsequent one of the data outputs;
the data monitory circuitry identifying the output change comprises the data monitory circuitry identifying the output change based on a difference between the data density for the initial one of the data outputs and the data density for the subsequent one of the data outputs.

15. A non-transitory computer-readable medium storing instructions to monitor operations of a data pipeline, wherein the instructions, in response to execution by one or more processors, cause the one or more processors to drive a system to perform actions comprising:
monitoring the operations of the data pipeline wherein the data pipeline receives data inputs, processes the data inputs, and responsively generates and transfers data outputs;
identifying an input change between an initial one of the data inputs and a subsequent one of the data inputs;
identifying an output change between an initial one of the data outputs and a subsequent one of the data outputs;
correlating the input change to the output change;

determining a quality threshold for the output change based on the correlation;

determining when the output change falls below the quality threshold;

generating an alert that indicates the input change and the output change when the output change falls below the quality threshold; and transferring the alert.

16. The non-transitory computer-readable medium of claim 15 wherein:

the output change comprises a data volume change between the initial one of the data outputs and the subsequent one of the data outputs; and wherein:

correlating the input change to the output change comprises correlating the input change to the data volume change.

17. The non-transitory computer-readable medium of claim 15 wherein:

the output change comprises a data schema change between the initial one of the data outputs and the subsequent one of the data outputs; and wherein:

correlating the input change to the output change comprises correlating the input change to the data schema change.

18. The non-transitory computer-readable medium of claim 15 wherein:

the output change comprises a data value change between the initial one of the data outputs and the subsequent one of the data outputs; and wherein:

correlating the input change to the output change comprises correlating the input change to the data value change.

19. The non-transitory computer-readable medium of claim 15 wherein:

the output change comprises a data type change between the initial one of the data outputs and the subsequent one of the data outputs; and wherein:

correlating the input change to the output change comprises correlating the input change to the data type change.

20. The non-transitory computer-readable medium of claim 15, the operations further comprising:

generating a histogram for the initial one of the data outputs that represents data density for the initial one of the data outputs;

generating another histogram for the subsequent one of the data outputs that represents data density for the subsequent one of the data outputs; and wherein:

identifying the output change comprises identifying the output change based on a difference between the data density for the initial one of the data outputs and the data density for the subsequent one of the data outputs.

* * * * *